US011317279B2

(12) United States Patent
Wolosewicz

(10) Patent No.: US 11,317,279 B2
(45) Date of Patent: Apr. 26, 2022

(54) CLIENT, COMPUTING PLATFORM, AND METHODS FOR CONDUCTING SECURE TRANSACTIONS

(71) Applicant: Certus Technology Systems, Inc., San Francisco, CA (US)

(72) Inventor: Jack Wolosewicz, San Francisco, CA (US)

(73) Assignee: Certus Technology Systems, Inc., San Francisco, CA (US)

( * ) Notice: Subject to any disclaimer, the term of this patent is extended or adjusted under 35 U.S.C. 154(b) by 359 days.

(21) Appl. No.: 14/293,112

(22) Filed: Jun. 2, 2014

(65) Prior Publication Data

US 2016/0073263 A1   Mar. 10, 2016

Related U.S. Application Data

(63) Continuation-in-part of application No. 13/964,593, filed on Aug. 12, 2013.

(60) Provisional application No. 61/682,532, filed on Aug. 13, 2012.

(51) Int. Cl.
| | |
|---|---|
| H04W 12/08 | (2021.01) |
| H04B 5/00 | (2006.01) |
| H04L 29/06 | (2006.01) |
| H04W 12/06 | (2021.01) |
| H04W 4/80 | (2018.01) |
| G06Q 20/16 | (2012.01) |
| G06F 21/64 | (2013.01) |

(52) U.S. Cl.
CPC ............ *H04W 12/06* (2013.01); *G06F 21/64* (2013.01); *G06Q 20/16* (2013.01); *H04B 5/0031* (2013.01); *H04L 63/0807* (2013.01); *H04L 63/0838* (2013.01); *H04L 63/0861* (2013.01); *H04L 63/10* (2013.01); *H04L 63/123* (2013.01); *H04L 63/18* (2013.01); *H04W 4/80* (2018.02); *H04L 2209/34* (2013.01)

(58) Field of Classification Search
CPC . H04L 63/0428; H04L 63/0435; H04L 63/08; H04W 12/04; G06F 21/602
USPC ........................................................ 713/150
See application file for complete search history.

(56) References Cited

U.S. PATENT DOCUMENTS

| | | | |
|---|---|---|---|
| 5,136,644 A | 8/1992 | Audebert et al. | |
| 5,668,876 A | 9/1997 | Falk et al. | |
| 9,195,980 B2 * | 11/2015 | Puura | G06Q 20/40 |
| 9,516,487 B2 * | 12/2016 | Powell | G06Q 20/3229 |
| 9,680,942 B2 * | 6/2017 | Dimmick | H04W 12/06 |
| 10,277,576 B1 * | 4/2019 | Yau | H04L 9/3236 |
| 10,484,345 B2 * | 11/2019 | Shastry | H04L 63/068 |
| 10,659,421 B2 * | 5/2020 | Backholm | H04W 12/06 |
| 10,664,844 B2 * | 5/2020 | Narayan | H04L 63/0838 |
| 2003/0204726 A1 * | 10/2003 | Kefford | H04L 63/0428 713/171 |
| 2004/0153649 A1 * | 8/2004 | Rhoads | G07D 7/004 713/176 |

(Continued)

FOREIGN PATENT DOCUMENTS

| | | |
|---|---|---|
| WO | 001058080 | 8/2001 |
| WO | 2005011191 | 2/2005 |

*Primary Examiner* — Yonas A Bayou
(74) *Attorney, Agent, or Firm* — STLG Law Firm; Soody Tronson

(57) ABSTRACT

The present invention is generally related to client and computing platforms that may be used for conducting secure transactions.

11 Claims, 2 Drawing Sheets

(56) References Cited

U.S. PATENT DOCUMENTS

| | | | | |
|---|---|---|---|---|
| 2007/0233615 A1* | 10/2007 | Tumminaro | ......... | G06Q 20/322 |
| | | | | 705/75 |
| 2007/0244811 A1* | 10/2007 | Tumminaro | ........... | G06Q 20/12 |
| | | | | 705/39 |
| 2007/0255662 A1* | 11/2007 | Tumminaro | ........... | G06Q 20/10 |
| | | | | 705/79 |
| 2014/0068272 A1* | 3/2014 | Savtchenko | .......... | H04L 9/3226 |
| | | | | 713/185 |

* cited by examiner

CLIENT, COMPUTING PLATFORM, AND METHODS FOR CONDUCTING SECURE TRANSACTIONS

RELATED APPLICATIONS

This application claims priority from and benefit of U.S. patent application Ser. No. 13/964,593, entitled "Client, Computing Platform, and Methods for Conducting Secure Transactions," filed Aug. 12, 2013, which claims priority from and benefit of U.S. Patent Application Ser. No. 61/682,530, filed Aug. 13, 2012, both of which are incorporated herein by reference in their entirety.

FIELD OF THE INVENTION

The invention pertains to client and computing platforms that may be used for conducting secure transactions.

BACKGROUND OF THE INVENTION

As electronic commerce continues to gain in popularity, a user who may purchase a variety of items from multiple websites may sometimes be required to remember a particular password for each website or vendor with whom the user does business. In some instances, a user may make use of an identical password for multiple websites so as to reduce the user's need to memorize, for example, perhaps a dozen or more passwords. In other instances, a user may store passwords in a single location, such as a physical notebook or an electronic file that may contain perhaps all of the user's passwords.

However, in the event that a user utilizes a single password for multiple websites, single security breach of a website may compromise a user's password-protected account information at each of the multiple websites. Accordingly, the user may find him or her in the unpleasant situation of being billed for items that he or she did not order or being billed for services that he or she will never receive. In other instances, perhaps which may arise when a user records passwords in an electronic file or physical notebook, loss or compromise of either the notebook or the electronic file may expose the user to significant financial liability.

SUMMARY OF THE INVENTION

In an implementation, a method for conducting a transaction may include generating a single-use token by an authoritative server, conveying the single-use token from the authoritative server to a client device, modulating a carrier signal to carry a data payload that contains the single-use token using any of the several available near field communications technologies and protocols, and comparing the single-use token generated by the authoritative server with a single-use token received by the receiving device. The method may also include, if a successful comparison has taken place, allowing the transaction to proceed. The method may also include, if a successful comparison has not taken place, terminating the transaction. A single use token may be a randomly generated number, the result of a hash operations or a variety of other mathematical operations.

In another implementation, a method for conducting a secure transaction may include a client device having one or more processors to receive a single-use token and to transmit a signal by way of a near field communications transmitter coupled to the one or more processors, wherein the signal represents a single use token.

In another implementation, a logic module for use with a browser may comprise a control element for activating a near field communications receiver for transmitting and/or receiving an acoustic signal, time-varying magnetic field, optical communication signal, QR code, or any combination thereof. The near field communications receiver receiving a single-use token for conducting a transaction.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
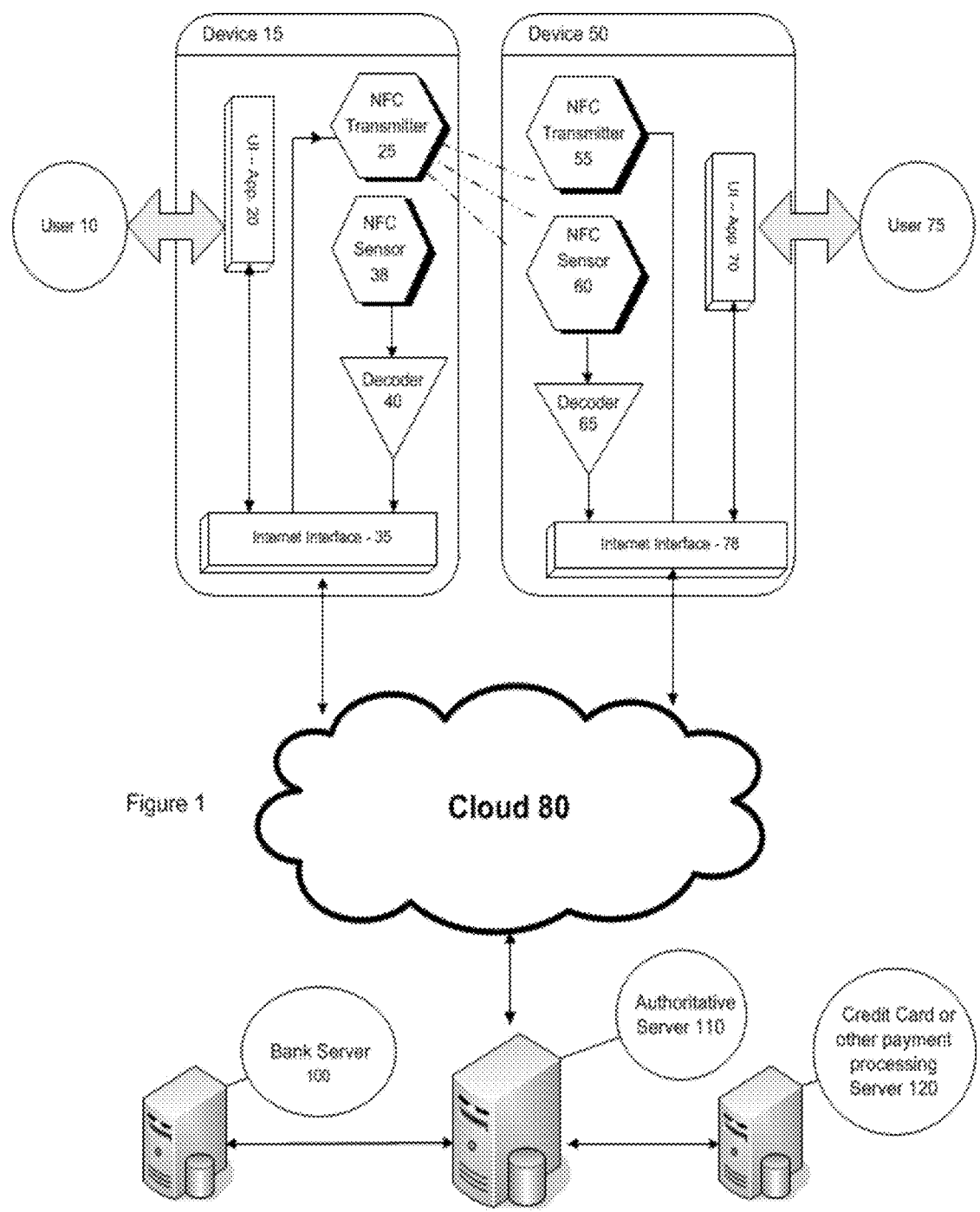
FIG. 1 is a block diagram showing a client and a computing platform for conducting a secure transaction in accordance with an embodiment.

In implementations, a mechanism may be created which may allow a user to employ a personal communications device, such as a cellular telephone, smart phone, or other device that may generally be associated with a particular individual, as well as other Internet-connected devices to quickly and easily gain access (e.g. log on) to websites, terminals, points of sale, or other Internet-connected entities in a highly securable manner. Upon logging into an e-commerce website, for example, a user may receive a single-use "token" on his or her personal communications device generated by an authoritative server. In addition, an authoritative server may convey a matching or perhaps complementary, for example, token to the e-commerce website or perhaps to a logic module which may execute, for example, on the e-commerce website. In other implementations, the token may be retained at the authoritative server as opposed to being conveyed to the e-commerce website.

To begin a transaction, the personal communications device may emit a signal, such as an audio signal, near field communications signal, Bluetooth-compatible signal, optical signal, or other identifier which may be conveyed by a point-of-sale terminal, laptop, desktop, or other computer accessing the e-commerce website. If the receiver receives the signal, the information contained within the signal may be conveyed to the authoritative server. The authoritative server may then authenticate the user, which may enable the user to engage in electronic commerce via the e-commerce website. In implementations, if authentication by the authoritative server has occurred, the token conveyed to the personal communications device and the matching or complementary token conveyed to the website may be erased. In this manner, a "single-use" token may be generated for the purpose of conducting the transaction and is not intended to be reused at a later time.

In implementation, the presence of only actual, human users gaining access to secured websites may be ensured, and the possibility of a nonhuman user, such as a "bot" or other software application that might impersonate a user, gaining access to a secured website may be precluded. The use of a personal communications device, which may inherently require intelligent manipulation by the user while simultaneously interacting with a website, may represent a feature that cannot be easily replicated by a bot or other software application that impersonates a user. Accordingly, challenge/response systems such as "Captcha," in which a human-generated response to a website-generated challenge may be used to guarantee the presence of a human user interacting with a website, may be replaced by embodiments of the claimed invention.

As the term is used herein, a "transaction" may include merely an exchange of secure information, such as the users "LinkedIn™" password, in which the user providing such a password may enable a user certain privileges as a registered user, security of the information passed between the user and the website can be assured. A "transaction" may also include a commercial exchange in which goods or services may be secured in response to a promise to pay for the goods or services. In these instances, as well as others, a transaction may take place without requiring use to passwords or other means of authentication by one or more parties involved in the transaction. In lieu of passwords or other authenticating information, the exchange of the single-use token described herein may be all that is required to authenticate a user involved in a transaction.

Additionally, in implementations, a user may not be required to remember passwords, which may allow a user to further enjoy an online shopping experience. In certain implementations, an e-commerce website, for example, may not be required to store a user's password, credentials, or other personal information, which may allow the e-commerce website to focus on providing goods and services at a competitive price. Accordingly, as e-commerce websites, for example, may no longer be required to store personal information corresponding to potentially thousands, or millions of customers, thefts of users' private information may be precluded from occurring.

Additionally, in implementations, a user may not be required to establish an account with on online entity, such as a secure website or an e-commerce website, as establishing an account is primarily a tool for later user authentication. User authentication may be accomplished, at least in part, via the secure, single-use token methodology described herein. In implementations, a user may log on via a secure, single-use token methodology described herein and may be authenticated without requiring the online entity to store, maintain, and guarantee security of users' authenticating and potentially sensitive information. However, in some implementations, a user may allow the online entity, such as a transacting website, to request name or other personal information to allow a customer relationship management record to be created, which may be desirable or needed to complete a transaction, and thereby be recognized upon a subsequent visit to the website. Alternatively, a user may choose to remain anonymous while still being authenticated as a legitimate user. Personal information may be held by the authoritative server and may be passed to the transacting website without the need for the user to enter and reenter identifying information such as passwords, as he or she uses various websites. In these embodiments, personal information may be collected by the authoritative server as part of an initial user application installation and initial user verification. Initial user verification may be a one-time process, which requires a user to submit personal identity information, which may include, but not limited to: name, address, Social Security number, credit card information for transactions, other bank information, shared secret information (e.g. mother's maiden name, father's middle name etc.) for later authentication, voice print, palm print, iris scan or other biometric characteristics unique to the user, which may be required for high-level user authentication by online entities or other entities requiring user authentication. Once the user has provided the information and is therefore authenticated, a mobile device application may be transmitted to the user. The application may comprise a unique serial number that uniquely identifies the user and may be sent to the authoritative server every time a logon or transaction is initiated by the user, wherein the unique serial number may be used to identify the user and, along with the single-use token, may be used to authorize secure website logons or e-commerce website transactions, for example. The unique serial number may be combined with the personal communications device identification in a variety of ways such as one or more mathematical operations including but not limited to a one way cryptographic hash functions such as MD5, SHA-2, just to name a few examples.

As mentioned previously, in implementations, near field communications may be used to communicate a token, for example, from a user's personal communications device to a participating e-commerce website, for example. Accordingly, near field communications may operate using a wide variety of short range communications technologies. For example, near field communications technology may comprise the use of an audio signal, which may comprise a signal that may begin at one frequency and end at another frequency (i.e. a "chirp") or a variety of FM, AM, Spread Spectrum or other techniques used in telecommunications systems today. Near field communications may comprise the use of inductive coupling, in which a time-varying magnetic field generated a first location, such as a client device, and may be sensed or detected at a second location, such as a laptop, desktop, point-of-sale terminal, handheld computing device, and so forth, upon which an e-commerce application (which may include a browser) may be operating. In implementations, the second location and the first location may be separated by between 1.0 and 20.0 cm, for example. However, it should be noted that in other implementations, time-varying magnetic fields may be sensed at locations greater than 20.0 cm, for example, and less than 1.0 cm, for example.

Near field communications may also comprise the use of binary digits represented by particular frequencies of an audio spectrum. In one possible example among numerous possible implementations, a logic state corresponding to a binary "0" may be conveyed using a tone of 400 Hz, for example. A logic state corresponding to a binary "1" may be conveyed using a tone of 1000 Hz, just to name two examples. Additionally, error control coding such as Hamming codes, Bose Chaudhuri-Hocquenghem codes, Reed Solomon codes, cyclic redundancy, or any error control coding technology may be applied to the binary digits that comprise the single-use token. Accordingly, integrity of an inviolate single use token can be assured, perhaps even when transmitted using electromagnetic, sonic or magnetic induction carrier modulation and transmitted over noisy channels.

FIG. 1 is a block diagram showing a client and a computing platform for conducting a secure transaction in accordance with an embodiment. In FIG. 1, device 15, may, for example represent a personal communications device, such as a cellular telephone, smart phone, or other device generally held or carried on the person of a user. In an implementation, device 15 may have connectivity to both cloud 80, by way of, for example, Internet interface 35. User 10 may operate device 15 by way of user interface application 20 to perform the various operations facilitated by device 15, such as sending and receiving mobile telephone communications, texting, personal navigation, gaming, social networking, and so forth.

In an implementation, user application 20 may represent a secure application that receives a single-use transaction token from, for example, authoritative server 110 by way of cloud 80 and an Internet interface 35. In particular implementations, authoritative server 110 may communicate with bank server 100 and/or credit card or other payment processing server 120 using, for example, standardized protocols such as OpenID, OAuth, SAML, just to name a few possible communications protocols. In one implementation, when a transaction between device 15 and device 50 is to be initiated, authoritative server 110 conveys a complementary and/or matching single-use token to device 50. In an implementation, single-use tokens conveyed to device 15 and device 50 may be identical. However, in other implementations, single-use tokens conveyed to device 15 and device 50 may not be identical but may instead be complementary such that when single-use tokens from device 15 and device 50 are combined, a deterministic solution results. In one possible example among many, single use-tokens from device 15 and device 50 may be added together to produce a "syndrome," which may equal a binary "0" or may add together to produce a different result. It should be noted, however, that although single-use tokens may be added, at least in one implementation, in other implementations single-use tokens may be subtracted from one another, multiplied by one another, convolved, or undergo any other logical or mathematical operation and claimed subject matter is not limited in this respect.

To identify the user 10 of device 15, near field communications transmitter 25 of device may emit a signal which may be detected by near field communication sensor 60 of device 50. Upon receipt of a signal, decoder 65 may decode the received signal. Accordingly, decoder 65 may perform demodulation of a signal in an audio domain, conversion of inductive and/or magnetic signals to a digital signal, or other conversion that enables the information states conveyed by near field communication transmitter 25 to be conveyed through Internet interface 78 to authoritative server 110.

Accordingly, in implementations, if user 10 is, for example, shopping at an e-commerce website, a shopping cart or other virtual container may be displayed to user 10 by way of user application 70, which may include a browser, running on device 50. If user 10 has selected at item for purchase, for example, near field transmitter 25 of device 15 may encode a single-use transaction token as a data payload, and modulate the payload by way of a modulation technique to be received by near field communication sensor 60 of device 50. Near field communication sensor 60 may demodulate the received signal to be decoded by decoder 65 and conveyed through Internet interface 78 to cloud 80 and to authoritative server 110. If authoritative server 110 authenticates the single-use token, the authoritative server may indicate to user application 70 that the transaction has been approved. Approval may indicate an assurance to the operator of the e-commerce website, for example, that the transaction has been completed and the item for purchase, for example, may be shipped to user 10.

Although the aforementioned transaction specifically identifies electronic commerce, nothing prevents other types of transactions, such as banking, bill payment, or any other type of transaction in which security may be enhanced by way of a generation of a single-use transaction token at a first device, such as device 15, which may be received by a second device, such as device 50. Accordingly, claimed subject matter is not limited in this respect. Further, a transaction may operate in a direction opposite to the direction described hereinabove. For example, devices 15 and 50 may represent, for example, smart phones or other devices capable of engaging in an electronic transaction. In an implementation, user 10 may wish to convey payment to user 75. In such an implementation, authoritative server 110 may generate a single-use token for use by user interface application 20. In such an instance, user 10 may select a dollar amount, for example, to be paid to a user 75. The authoritative server 110 may generate a single use token to be conveyed to device 15 for transmission by near field communications transmitter 25. If near field communication sensor 60 receives the modulated single-use token, the single-use token may be compared with a single-use token conveyed by authoritative server 110 to device 50. In the event that the comparison indicates a match between single-use tokens, payment from a bank account associated with user 10 may be conveyed to a bank account associated with user 75.

Figure 2:
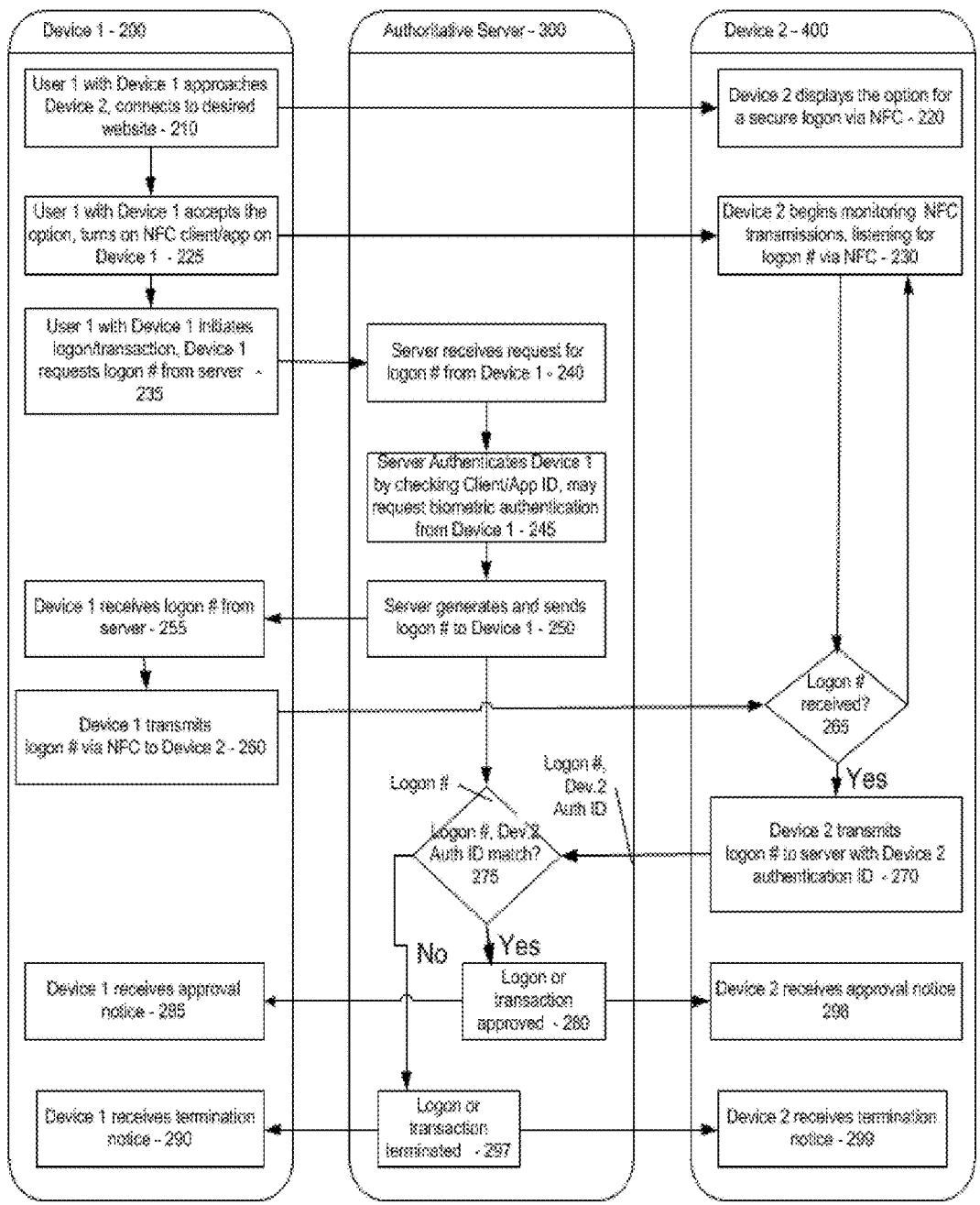
FIG. 2 is a flow diagram for a method for conducting a secure transaction by way of a single-use token according to an embodiment.

FIG. 2 is a flow diagram for a method for conducting a secure transaction by way of a single-use token according to an embodiment. At block 210, a user, such as user 10 of FIG. 1, associated with device 1 (200) approaches device 2 (400). Device 2 may connect to a desired website, such as an e-commerce website. At 220, device 2 (400), which perhaps may be associated with an e-commerce website, displays an option for secure logon by way of near field communications. At 225, a user associated with device 1 (200) may accept the option and activate a near field communications client application which may execute on device 1 (200). Device 2 (400) may begin monitoring near field communications for detection of a logon identification of user 1, such as at block 230. Device 2 may, at least in some implementations, comprise a capability for activating a near field communications receiver, such as a microphone input, a sensor for sensing time-varying magnetic fields, and so forth.

At block 230, a user associated with device 1 (200) may initiate a logon to the e-commerce website, for example. Device 1 (200) may request a logon identification from, for example, an authoritative server, such as authoritative server 300. In response, authoritative server 300, at block 240, may receive a request for a logon from the device 1 (200). At 245, an authoritative server (300) may authenticate device 1 (200) by requesting, for example at block 245, biometric authentication from a user associated with device 1 (200). Such biometric authentication may include, but not be limited to, retinal scan, palm print, voice print, keyword annunciation, thumbprint, or other identification. Most modern personal communications devices all include a camera and microphone in which a retinal scan, palm print, voice print, keyword annunciation, thumbprint, or other biometric features may be captured, analyzed, and sent to the authoritative server for verification. At block 250, authoritative server 300 may generate a single-use transaction code for use by device 1 (200). At block 255, device 1 (200) may receive the single-use token from authoritative server 300.

At block 260, device 1 (200) may transmit single-use token to be received by device 2 (400) by way of a near field communications receiver. At 265, device 2 (400) may receive the single-use token. At block 270, device 2 (400) may transmit the received single-use transaction identifier along with any other authentication information to authoritative server 300. At block 275, authoritative server 300 may compare received single-use tokens generated by the authoritative server with a single-use token received by device 2 (400) at block 265. In the event that the comparison (275) results in a positive match between generated and received single-use tokens, block 280 may be performed in which a transaction may be approved by an authoritative server (300). At 285, device 1 (200) may receive approval for the transaction to occur from authoritative server 300.

In the event that the comparison of block 275 performed by authoritative server 300 does not indicate a match between generated and received single-use tokens, a transaction may be terminated, such as at block 297. Such termination may deactivate or erase single-use tokens so that any subsequent transaction may require the generation of a new single-use token. At block 285, device 1 (200) may receive a termination notice. At block 299, a website which may correspond to an e-commerce website, may also receive a termination notice.

In other implementations, a personal communications device software application/module or another device containing a software application/module (mobile, laptop, desktop, or terminal or server/computer) which includes a near field communications capability may communicate with another device (mobile, laptop, desktop, any terminal or server/computer) comprising a near field communications capability via a near field communications link. Devices may also communicate with an authoritative server via the Internet. In implementations, more than two devices may be involved in the transaction. The authoritative server then implements, monitors and controls a secure logon/transaction protocol described hereinabove. Alternately, one or more of the parties involved in the secure logon/transaction may be proxied by a dedicated website in a clientless configuration.

Implementations may use a smart personal communications device with a mobile application to be loaded on it which may use near field communications to communicate with a device/website which can receive and or transmit near field communications signals. This can be implemented as radio frequency near field communications enabled devices or through the use of sonic transmission/reception of data which does not require radio frequency based near field communications but only uses the existing microphones and speakers on personal communications devices, laptop, desktop computers and terminals.

In other implementations, a method for conveying a single-use transaction token between interacting parties employ one or more one or two dimensional barcodes that may be displayed by an enabled device and be photographed by a user's personal communications device and analyzed by bar code reading digital signal processor application. In other implementations, one or more one or two dimensional barcodes may be displayed on a user's personal communications device and be photographed by an enabled device or devices and analyzed by barcode reading digital signal processing applications.

The transmission of the single-use transaction token may be from a user to an enabled device or from an enabled device to the user, as long as all parties to a transaction obtain the same single-use transaction token and are able to send a single-use transaction token concurrently or within a short, limited timeframe, for example, to the authoritative server for authentication. In one example, a single-use transaction token may "survive" or perhaps, a fraction of a second. Accordingly, an authoritative server may generate a single-use transaction token and a matching or complementary token for use by a website. In an implementation, both the single-use transaction token and the matching or complementary token for use by website, wherein both must be used within, for example, one half second or less, although claimed subject matter is not limited in this regard. In some implementations, a single use transaction token and a matching or complementary token may survive for a fraction of a second, a few seconds, or, perhaps as long as a few minutes or a longer period of time. The short life of a token and its single use ensure security against a variety of "Man in the Middle" attacks where communication may be intercepted, decoded or recorded by an attacker for subsequent use in an illegal transaction. The single-use and short life ensures that the token can only be used once in the original transaction and is then no longer be valid.

Similarly, the transmission of the transaction number may be from user to user, personal communications device to personal communications device, to provide for mutual user authentication and to enable information to be exchanged between users or a transaction between users to be executed.

It should be noted that there exist many topologies for passing single-use tokens to devices and complementary or matching tokens to receiving websites or other processing entities. In another example, a token may be generated on an authoritative server and conveyed to a user's personal communications device. If the single-use token has been received a personal communications device, the token may be conveyed by way of near field communications to a browser, which may display a website by way of using browser ad-on modules such as Flash, or other, typical add-on module or other media players for viewing animations and/or movies using computer programs such as a web browser. In an implementation, in lieu of Flash, a browser may run HTML-5. In either instance, for example, a microphone may be enabled by the browser add on, such as Flash, HTML-5, or a media player, wherein the microphone may be coupled to a digital signal processor, which may recover the received single use token, perhaps conveyed by way of an acoustic signal. The digital signal processor may recover or extract the single-use token from the signal, and convey the received token to an authoritative server to so that the received token may be compared against the token originally generated by the server, thereby authenticating both sides of the transaction and authorizing the transaction, for example.

In certain implementations, a graphic, icon, or other form of active link may be displayed in a browser window. A user seeking authentication may then link to an authoritative server by way of activating the link, which may permit transmission of extracted voice parameters, and/or a single-use token, to the authoritative server. In particular implementations, however, an appropriate browser application such as HTML5, Flash, or other application may bring about a link to an authoritative server without a need for displaying a graphic, icon, or other form of active link in a browser window. In such an instance, a user's mobile device, which may comprise a cellular telephone, smart phone, or other portable communications device, may operate an authentication application to receive a single-use token, for example, which may be generated by an appropriate browser application. In particular implementations, a single-use token may be transmitted through speakers of a laptop computing device, for example, for receipt by the user's mobile device.

A single-use token, which may be generated by a browser, may comprise one or more of an acoustic signal, a near field electromagnetic type communications signal, an optical communications signal, a QR code, or other signaling technique, which may be generated by a browser application, and received by a mobile device. A browser application may, for example, receive an encoded single-use token for transmittal to an authoritative server for conversion to a near field signal which may be received by a user's mobile device. In addition to extracted parameters from a near field signal generated by, for example, a browser, a user's mobile device may additionally convey mobile device parameters, such as authentication application ID number, device ID number, device profile, and so forth, which may be utilized, for example, by an authoritative server to identify the mobile device taking part in an authentication process. Accordingly, a user interface to a browser window, for example, may be simplified in that a user may avoid interacting with a graphic, icon, or other active link to permit transmittal of a single-use token to a browser server, which may function as an authoritative server.

In another topology, a token may be generated by a background process which may run as part of a browser program (for example, running at a website "back end"), executing as code or script in a browser add on module such as Flash, HTML-5, or a media player running in the background or foreground. The token generated by the website back end may be sent to an authoritative server. The single-use token may be conveyed by the authoritative server to a personal communications device, wherein the personal communications device, perhaps by way of near field communications, may transmit the single-use token to a browser running the background process. In this implementation, the authentication process (that is, the comparison of the single-use token received from the personal communications device with the single-use token generated by the browser background process) may be performed using the browser perhaps by way of the browser's own authentication process. In other instances, authentication may be performed at an authoritative server.

In another topology, a website browser may make use of near field communications to transmit a single-use token to a personal communications device. The personal communications device and that website browser may simultaneously, or nearly simultaneously, both convey the single-use token to an authoritative server for comparison.

In another topology, a website browser may be open and/or running on a personal communications device, and a user of the personal communications device may log on to an e-commerce or other website requiring authentication so that a transaction may be performed. In this scenario the e-commerce or other website requiring authentication may be open in a browser window, for example, on the personal communications device and may be able to communicate via browser or browser add-on (Flash, HTML, HTML 5, etc.), with the personal communications device application designed to, or adapted to, manage the single-use token methodology described hereinbefore. A user may click on a website button (e.g. radio button) requesting authentication. In response the browser may send a request to the personal communications device application. The personal communications device application may receive the request and in response, may request a single-use token to be sent by the authoritative server to the e-commerce or other website requiring authentication, currently open and/or running in the browser. The e-commerce or other website requiring authentication, currently open in the browser may receive the requested token from the authoritative server and then sends the single-use token to the personal communications device application. In response, the personal communications device may receive the single-use token, send the single-use token back to the authoritative server where the token may be compared to the token recently conveyed to the e-commerce or other website requiring authentication, currently open and/or running in the browser. If there is a match or other comparison, the user may be authenticated in addition to the e-commerce website.

Other channels of communication between the browser and the personal communications device application, which may be designed to, or adapted to, manage the single-use token methodology may be exploited to complete the token delivery and token matching loop needed for user and website authentication. The browser may send information to the personal communications device speaker which may be monitored directly or via the personal communications device microphone by the personal communications device application designed to, or adapted to, manage the single-use token methodology. In this case the information containing the token may be encoded using acoustic signal modulation. In another implementation, the personal communications device application may be designed to, or adapted to, manage the single-use token methodology may send information to the personal communications device speaker which may be monitored directly or via the personal communications device microphone by the browser. The single-use token may be passed via the browser to the application or via the application to the browser, to wind up at the authoritative server for comparison. Alternately token comparison may be done by the browser, the e-commerce website back end or at the personal communications device application designed to manage the single-use token methodology Alternately, browser and application may communicate by writing and reading to and from browser cookies, which may be accessible to the personal communications device application designed to manage the single-use token methodology.

As mentioned previously, implementations may be useful in partially or even completely replacing conventional user verification techniques such as "Captcha," which deny website access to web bot crawlers by ensuring that the entity accessing the website is human. "Captcha" schemes may, for example, comprise one or more displayed or audible words or phrases presented to a user. In response, a user may enter the received or displayed Captcha phrase into a website browser. The website may then compare the generated Captcha phrase with the received Capture phrase and authentication may take place. However, many users find this process to be difficult and error prone, as displayed or audible words or phrases can be visually or audibly garbled and therefore may be difficult to interpret and/or recite. In many instances, users must go through several iterations until authentication can be successfully completed.

Biometric authentication may also be used for authenticating higher value transactions, or perhaps when user's personal communications device is lost or stolen. In such an implementation, a website or authoritative server may require that a user authenticate themselves via a biometric identifier, such as a voice print, magnetic, palm prints scan, or perhaps answering a secret question, such as "What is the make and model of your first car?"

Accordingly, it is intended that many, many topologies and architectures may fall under the true spirit of the claimed invention. Although the above-implementations and embodiments have been set forth, these are merely illustrations of the claimed concepts.

That which is claimed:

1. A method for providing enhanced security during a secure transaction comprising:
receiving by a client device an option to securely connect with a receiving device via a near field communication interface corresponding with a first communication path when the client is within short range communication of the receiving device, wherein the receiving device is associated with an e-commerce website and wherein the client device is connected to the cloud via an Internet interface corresponding with a second communication path, and wherein the option is a display on the client device for secure logon by way of the first communication path;

accepting the option by the client device;

initiating a logon to the e-commerce website from an authoritative server via the Internet interface;

generating by the authoritative server, an authenticating single-use token encoded using an error control code in response to the accepting the option via a wireless interface wherein the authenticating single-use token is time limited to less than approximately three minutes;

receiving the authenticating single-use token by the client device;

transmitting, via an audible audio signal corresponding with a third communication path, the authenticating single-use token via speakers of a client device;

receiving the authenticating single-use token via a microphone of the receiving device;

transmitting the authenticating single-use token to the authoritative server by the receiving device using a fourth communication path;

comparing, by the authoritative server, the authenticating single-use token generated by the authoritative server with the transmitted authenticating single-use token transmitted by the receiving device; and verifying an identity of the client device to perform the secure transaction on the e-commerce website by the authoritative server, at least in part, on an outcome of the comparing, wherein the first, second, third, and fourth communication paths are utilized before the secure transaction.

2. The method of claim 1, further comprising:
conducting the secure transaction by the client device via the Internet interface.

3. The method of claim 1, further comprising:
authenticating the client device by the authoritative server upon accepting the option by the client device.

4. The method of claim 3, wherein the client device is authenticated by the authoritative server based on a biometric authentication selected from the group consisting of: a retinal scan, a palm print, a voice print, a keyword annunciation, and a thumbprint.

5. The method of claim 1, wherein the receiving device comprises a laptop computer, a desktop computer, a smart phone, or combination thereof, any one or more of which executes a browser application.

6. The method of claim 1, wherein the client device comprises a laptop computer, a desktop computer, a smart phone, or combination thereof, any one or more of which executes a browser application.

7. A system for making secure transactions comprising:
a client device comprising:
  a first near field communication interface corresponding with a first communication path:
  a first wireless interface corresponding with a second communication path over which the secure transactions are performed; and
  an audible audio transmission interface corresponding with a third communication path over which an authenticating single-use token is transmitted;
a receiving device comprising:
  a second near field communication interface for initiating communication with the client device;
  a second wireless interface
  an internet interface corresponding with a fourth communication path; and
  an audible audio reception interface over which an authenticating single-use token is received; and
an authoritative server in wireless communication with the client device via the first wireless interface and with the receiving device, the authoritative server comprising:
  an authenticating single-use token generator, wherein the authenticating single-use token is time limited to less than approximately three minutes;
  an interface capable of conveying the authenticating single-use token encoded with an error control code, to the client device; and
  a processor to determine that the authenticating single-use token has been successfully conveyed from the client device to a receiving device, the processor to:
    initiate transmission, via an audible audio signal, of the single-use token from one or more speakers of the client device via the audible audio transmission interface to be received by a microphone of the receiving device via the audible audio reception interface, and
    obtain, from the receiving device, the transmitted single-use token, and
    authenticate the single-use token based, at least in part, on a comparison between the single-use token transmitted from the one or more speakers of the client device with the single-use token obtained from the microphone of the receiving device, wherein the first, second, third, and fourth communication paths are utilized before the secure transaction is made.

8. The system of claim 7, wherein the authoritative server is configured to compare the generated authenticating single-use token conveyed to the client device with the authenticating single-use token received by the receiving device; and
  if a match exists between the authenticating single-use token conveyed to the client device and the authenticating single-use token received by the receiving device, approving a transaction based on the comparison.

9. The system of claim 7, wherein the authoritative server is configured to compare the generated authenticating single-use token conveyed to the client device with the authenticating single-use token received by the receiving device; and
  if a match does not exist between the authenticating single-use token conveyed to the client device and the authenticating single-use token received by the receiving device, denying a transaction based on the comparison.

10. The system of claim 7, wherein the processor is additionally configured to perform a mathematical operation to establish a match between the authenticating single-use token conveyed to the client device and the authenticating single-use token received by the receiving device.

11. The system of claim 10, wherein the processor performs mathematical operation selected from the group consisting of: addition, subtraction, convolution, comparison, correlation, or any combination thereof.

* * * * *